(12) United States Patent
Wetzel et al.

(10) Patent No.: US 6,380,535 B1
(45) Date of Patent: Apr. 30, 2002

(54) OPTICAL TUFT FOR FLOW SEPARATION DETECTION

(75) Inventors: Todd G. Wetzel; Sandra F. Feldman, both of Niskayuna, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/369,472

(22) Filed: Aug. 6, 1999

(51) Int. Cl.$^7$ .................................................. G01J 1/04
(52) U.S. Cl. ............................. 250/227.14; 73/170.02; 73/170.12
(58) Field of Search .................. 250/227.14; 73/170.02, 73/170.11, 170.12

(56) References Cited

U.S. PATENT DOCUMENTS 4,061,029 A * 12/1977 Fletcher et al. ............... 73/180
5,461,910 A * 10/1995 Hodson et al. ........... 73/170.12

OTHER PUBLICATIONS

NASA Technical Memorandum 110445: Director's Discretionary Fund Report for Fiscal Year 1996, Ames Research Center Mar. 1997, Cho et al, Development of Fiber–Optic Sensors for Studies of Transition from Laminar to Turbulent Flow, p. 47.*

* cited by examiner

Primary Examiner—F. L. Evans
(74) Attorney, Agent, or Firm—John F. McGowan

(57) ABSTRACT

Disclosed are flow separation detectors and, more particularly feedback sensor arrangements adapted to provide for the measurement of surface aerodynamic flow phenomena, and especially with regard to aerodynamic flow separation which is encountered over a surface. In order to obviate or ameliorate the electrical energy requirements in the provision of feedback sensor arrangements, particularly such which are employed for a closed-loop control of aerodynamic flow separation; for instance, that on the wing of an aircraft wherein there can be encountered a breakdown of a boundary-layer flow which may adversely affect the performance of the aircraft, provided is a novel system of flow separation sensors which are based on fiber optics and which may be employed for separation feedback control. In particular, the sensors which are based on fiber optics may employ an optical tuft arrangement based on the thermal/fluidic principles of the electrical thermal tuft, but with the employing of fiber optics signal and energy transmission instead of electronics. To that effect, the light transmitted through the fiber optics is adapted to be converted into heat enabling a packet of heated fluid to be convected in the direction of a predominant aerodynamic flow, and to impact or contact one of the temperature sensors which are based on fiber optics at a small following time interval, so as to provide the required information concerning aerodynamic flow separation.

12 Claims, 1 Drawing Sheet

OPTICAL TUFT FOR FLOW SEPARATION DETECTION

BACKGROUND OF THE INVENTION

Field of the Invention

The present invention relates to flow separation detectors and, more particularly relates to feedback sensor arrangements adapted to provide for the measurement of surface aerodynamic flow phenomena, and especially with regard to aerodynamic flow separation which is encountered over a surface.

Currently, various types of detection or sensor systems are being investigated for their applicability to the technology concerning problems which are being encountered as a consequence of aerodynamic flow separation; for instance, such as during airflows over the wing surfaces of an aircraft, and which may have a important bearing on and potentially adversely influence the performance of the aircraft. For example, some of the systems being investigated provide for a so-called closed-loop control of aerodynamic flow separation, which necessitate the provision of feedback sensors which are sensitive to flow separation, and whereby such sensors are typically required to be surface-mounted on the surface or wall which is subject to aerodynamic flow separation. At this time, essentially fully developed and commercially available sensors employed for this purpose are pressure transducers which are capable of measuring surface aerodynamic phenomena and few separation parameters.

In particular, types of sensors which are adapted for the investigation or measurement of aerodynamic flow separation which takes place on a surface or wall may be so-called electronic "thermal tuft" sensors. Thus, in essence, thermal tuft sensors may be generally constituted of one or more electrical heating elements with temperature sensors being mounted spaced upstream and downstream thereof along the presumed directions of aerodynamic flows passing over a surface. Generally, the flow separation, encountered in at least a two-dimensional flow, is defined by a location wherein the flow proximate a wall over a surface tends to oppose a primary flow direction; pursuant to a phenomenon referred to as a backflow. Thus, the thermal tuft sensors are spacedly mounted in the presumed flow direction. The electrical heating elements are normally pulsed on and off, thereby heating a local packet of fluid providing the aerodynamic flow. Depending upon the local instantaneous direction of the flow, either the upstream or downstream located temperature sensor will detect a rise in temperature as the heated packet of fluid is convected therepast. Generally, the pulses are counted as a measure of the percentage of the time during which the flow is either upstream or downstream in its direction. Alternatively, the time internal between the heater element actuation and sensor detection can be recorded as a measure of near-wall upstream or downstream velocity magnitude.

Such electronic "thermal tuft" sensors are extensively described, in an article by Shivaprasad and Simpson entitled "Evaluation of a Wall-Flow Direction Probe for Measurements in Separated Flows", published in the Journal of Fluid Engineering, 1981. In that instance, a pair of thermal sensors are spaced along a surface whereby a free stream of a fluidic or airflow may have a flow direction extending across the locations of the sensors. A plurality of heaters are interposed between the sensors, and further heaters are arranged offset aside the directional flow so as to be able to determine aerodynamic separation or, in essence, a breakdown of a boundary-layer flow of fluid passing across the surface which may pass either directly across the sensors or at an angle relative thereto. These sensors are electronically connected to the electrical or electronic circuitry of a device which; for example, may be a part of an aircraft electrical operating system.

Although the foregoing thermal tuft sensors are generally satisfactory in operation in detecting flow separation phenomena, they require the input of electrical energy from the electrical components of various devices, or in connection with aircraft from the electrical aircraft system network, thereby representing a source for electrical energy drain and consumption.

SUMMARY OF THE INVENTION

Accordingly, in order to obviate or ameliorate the electrical energy requirements in the provision of feedback sensor arrangements, particularly such which are employed for a closed-loop control of aerodynamic flow separation; for instance, that on the wing of an aircraft wherein there can be encountered a breakdown of a boundary-layer flow which may adversely affect the performance of the aircraft, pursuant to the present invention, there has been developed a novel system of flow separation sensors which are based on fiber optics and which may be employed for separation feedback control. In particular, the sensors which are based on fiber optics may employ an optical tuft arrangement based on the thermal/fluidic principles of the electrical thermal tuft, but with the employing of fiber optics signal and energy transmission instead of electronics. To that effect, the light transmitted through the fiber optics is adapted to be converted into heat enabling a packet of heated fluid to be convected in the direction of a predominant aerodynamic flow, and to impact or contact one of the temperature sensors which are based on fiber optics at a small following time interval, so as to provide the required information concerning aerodynamic flow separation.

Although various sensors have been developed which are based on fiber optics, these are primarily employed for the measurement of strain, acceleration and temperature, and currently there is the development of new pressure transducers in the technology. However, none of these sensors in themselves are designed for flow separation detection, particularly for use in the closed-loop control of aerodynamic flow separation, or for investigations of breakdown phenomena in boundary layer flow situations.

Accordingly, it is an object of the present invention to provide an arrangement for the investigation of aerodynamic flow separation.

A more specific object of the present invention is to provide a sensor arrangement for the investigation of aerodynamic flow separation utilizing flow separation thermal tuft sensors which are based on fiber optics.

Yet another object of the present invention is to provide for novel feedback thermal tuft sensors which are based on fiber optics, wherein these are employed for aerodynamic separation feedback control, particularly with regard to aerodynamic flow separation taking place on the wing surfaces of an aircraft.

A still further more specific object of the present invention rises in the provision of feedback sensor arrangements for the closed-loop control of aerodynamic flow separation which are adapted to extend through or to be positioned within the skin structure of an aircraft wing or airfoil.

BRIEF DESCRIPTION OF THE DRAWINGS

Reference may now be had to the following detailed description of preferred embodiments of the invention, taken in conjunction with the accompanying drawings; in which.

DETAILED DESCRIPTION OF PREFERRED EMBODIMENTS

Figure 1:
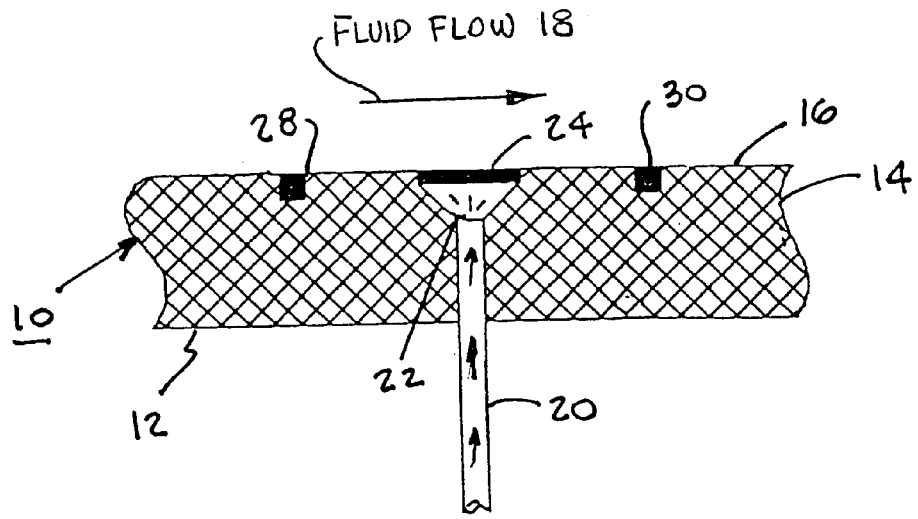
FIG. 1 illustrates, generally diagrammatically, a first embodiment of a feedback sensor arrangement utilized for the control of aerodynamic flow separation, and which employs a fiber optic thermal tuft sensor configuration extending through the skin of an aircraft wing.

Referring to FIG. 1 of the drawings, there is illustrated, generally diagrammatically, a fragmentary cross-sectional portion 10 of the skin 12 of an aircraft wing or airfoil 14. Extending through the wing skin 12 towards the upper surface 16 thereof which is subject to an aerodynamic airflow 18 which may be subject to an airflow separation or breakdown of the boundary-layer flow, is an optical fiber 20 which carries a high-power pulsed light being transmitted thereto from a light source (not shown). This light may be in the magnitude of a few watts. Proximate the surface 16 of the skin 12 of the wing 14, the optical fiber 20 is terminated so as to allow for a small air gap 22 which extends toward the surface 16 of the wing. This air gap 22 may widen upwardly and have the shape of an inverted frusto-conical configuration, as illustrated, and circular in transverse cross-section. Towards the skin surface 16 there is provided a low-thermal mass 24, which may consist of a specially coated target and which is essentially of a material possessing a low transmissivity and high emissivity, which is adapted to convert the light to heat when impinged upon by the high-power light emanating from the optical fiber 20. This particular low thermal mass 24 is specially coated to rapidly convert a significant portion of the fiber optic-transmitted light energy into heat which then radiates outwardly from the wing surface 16. Preferably, the low thermal mass 24 may be constituted of any suitable metallic material, such as aluminum foil, which is painted with a black paint or coated with a black lacquer. However, other materials possessing similar properties can also be conceivably utilized for this purpose.

Arranged respectively upstream and downstream of the optical fiber 20 having the optical tuft formed by the mass 24 generating the heat are fiber-optic temperature sensors 28, 30 which are at predetermined distances from the mass 24 along the flow direction 18 of the air or aerodynamic fluid flowing across the surface 16 of the wing 14. The fiber-optic temperature sensors 28, 30 are each adapted to sense the thermal conditions of the fluid flow inasmuch as the low-thermal mass 24 of the target which is provided for by the optical tuft is quickly heated by the light emanating from the optical fiber 20, and thereby any near-wall fluid passing along the exterior or surface past the target is rapidly heated. This packet of heated fluid or aerodynamic flow portion is convected in the direction of the predominant flow of the fluid passing over the wing surface 16 and strikes one of the fiber optic-based temperature sensors 28 or 30 at some close time interval subsequent to passing and being heated by the target mass 24.

Figure 2:
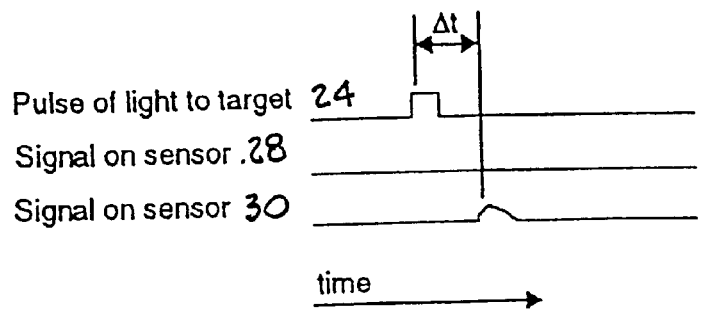
FIG. 2 illustrates a graphical time plot of a signal derived from the thermal tuft sensor arrangement of FIG. 1 for the flow direction illustrating the operation of the sensor arrangement.

Referring to FIG. 2 of the drawings, disclosed are the expected signals which are generated in response to the pulsed light from the optical fiber 20 heating the optical tuft mass 24 or target, and which then results in forming a packet of heated fluid from the aerodynamic flow 18.

Shown is the pulsed light emanating from the optical fiber 20 to the target, comprising the low-thermal mass 24 or optical tuft, heating the latter rapidly and wherein the packet of heated air passes upwardly and in the flow direction 18; in this instance, towards sensor 30. The rise in heat is plotted over the arrival time Δt at which the flow 18 has reached the particular sensor 30 from the optical tuft 24. This indication is provided for, as shown in FIG. 2, by a rise in temperature registered by the sensor 30, also indicating that the direction of the flow in FIG. 2 is from left to right. It is also noted that either measurement as to flow direction or velocity magnitude can be implemented with no consideration required to be given to the magnitude of the temperature rise detected by the fiber-optic temperature sensors 28, 30.

Thus, as illustrated in FIG. 2, the time interval Δt between the light pulse emanating to the target 24 and causing the rise in temperature, and the temperature peak sensed at the thermal fiber-optic sensor 30 provides a measure of near-wall velocity or aerodynamic flow.

Figure 3:
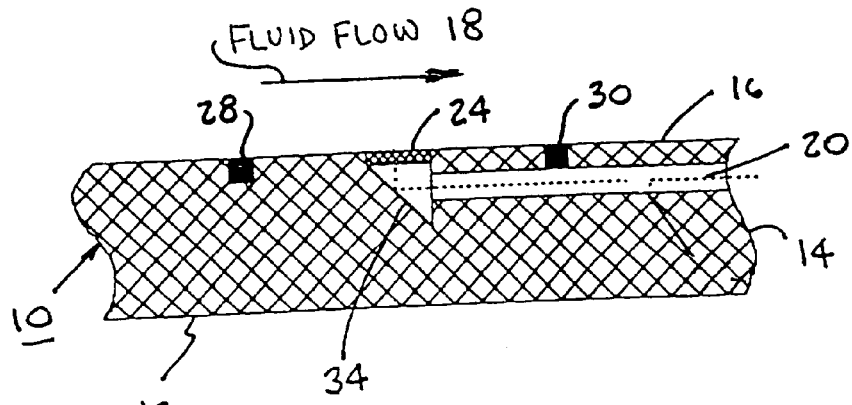
FIG. 3 illustrates a fiber optics thermal tuft sensor arrangement similar to FIG. 1 pursuant to a preferred modified configuration.

With regard to the embodiment of FIG. 3 of the drawings, which functions in a manner essentially identical with that disclosed in FIGS. 1 and 2, and wherein components which are identical or similar to those referred to hereinabove are designated with the same reference numerals.

In this embodiment, the optical fiber 20 which transmit the high-power pulsed light towards the optical tuft or mass 24 is arranged entirely within the skin 12 of the aircraft wing 14, and essentially extends in parallel with or closely below the wing surface 16. In that instance, in order to enable the low-transmissivity and high-emissivity coating of the thermal mass 24 which forms optical tuft to be heated by the light from the optical fiber 20, there is provided a prism 34 which is interposed between the end of the optical fiber 20 and the target or optical tuft 24, which prism turns the light through, preferably, 90°. Alternatively, it is also possible that rather than providing the small prism 34 and a suitable coating (such as black paint or lacquer) on the outer surface thereof which converts the light to heat, to mount a small mirror (not shown) which turns the light. Such optical components may be similar to the type of elements which can be employed in the manufacture of optical endoscopes, although other types of designs and structures may be readily utilized. The embodiment of FIG. 3 is preferred, inasmuch as the arrangement of the optical fiber entirely within the wing skin 12 allows it to be either positioned along the top of the wing surface 16 or embedded therein during a composite curing process, and would not necessitate any penetrating of the skin 12 from the interior of the airfoil or wing 14. This curing process essentially indicates that all of the sensor and fiber optics components, or portions thereof, are embedded in liquefied plastic materials for producing the aircraft wing skin, and then cured; i.e. hardened, in conjunction with the latter.

Although the foregoing optical thermal tuft structures and fiber-optic sensor arrangements have been described in conjunction with the use thereof for the closed-loop control of aerodynamic flow separation, particularly for the wings of an aircraft, and intended as feedback sensor for active flow control on aircraft, the invention is readily applicable to flow sensing in any fluidic device, including gas turbines and aircraft engines, as long as the optical fiber and any other exposed components are designed to be able to withstand the operating flow temperatures. Concerning closed-loop control of aerodynamic flow separation, this may entail the installation of suitable control actuators distributed over the surface areas of the wing or aircraft which are operatively connected with the thermal sensors. These actuators, in turn, may be connected to control devices, such as wing flaps, ailerons, flow jets, bumps and other retractable devices which are adapted to modify the flow conditions. Accordingly, this system of sensing and detecting flow separation, enables the sensors to generate signals and transmit them to the actuators so as initiate corrective procedures in controlling the aerodynamic flow.

While there has been shown and described what are considered to be preferred embodiments of the invention, it will, of course, be understood that various modifications and changes in form or detail could readily be made without departing from the spirit of the invention. It is, therefore, intended that the invention be not limited to the exact form and detail herein shown and described, nor to anything less than the whole of the invention herein disclosed as hereinafter claimed.

What is claimed is:

1. An arrangement for the detection of aerodynamic flow separation of a fluidic flow passing over a surface; said arrangement comprising:

(a) an optical fiber communicating with said surface; means for transmitting a high-power light through said optical fiber towards said surface;

(b) means interposed between said optical fiber and said surface for converting said light into heat which is radiated outwardly of said surface so as to form a packet of heated fluid;

(c) and fiber-optic temperature sensors being located at said surface respectively upstream and downstream of said optical fiber and light-converting means in the direction of fluidic flow, said sensors being responsive to said packet of heated fluid convected therepast so as to generate signals indicative of flow separation phenomena.

2. An arrangement as claimed in claim 1, wherein said light-converting means comprises a low-transmissivity high-emissivity mass forming a rapidly heated target responsive to said light.

3. An arrangement as claimed in claim 2, wherein said mass comprises a metallic foil which is coated with a black paint or lacquer.

4. An arrangement as claimed in claim 3, wherein said metallic foil is constituted of aluminum.

5. An arrangement as claimed in claim 2, wherein an air gap is formed intermediate an end of said optical fiber emitting the light and said light-converting means.

6. An arrangement as claimed in claim 2, wherein said light emanating from said optical fiber is a pulsed light, and wherein a time interval between a pulse of light and a temperature peak on one said sensor provides a signal indicative of fluid flow velocity.

7. An arrangement as claimed in claim 1, wherein said surface is formed by the skin of an aircraft wing, said light-converting means and said temperature sensors being recessed in said skin at said surface.

8. An arrangement as claimed in claim 7, wherein said optical fiber extends through said skin into the interior of said wing.

9. An arrangement as claimed in claim 7, wherein said optical fiber extends within said skin essentially in parallel with said surface.

10. An arrangement as claimed in claim 9, wherein said optical fiber extends at an angle of about 90° relative to said light-converting means; and prism means being interposed between the end of said optical fiber emitting said light so as to direct said light towards said means for converting said light into heat.

11. An arrangement as claimed in claim 1, wherein said arrangement comprises a system for the closed-loop control of aerodynamic flow separation.

12. An arrangement as claimed in claim 1, wherein said arrangement comprises an optical thermal tuft sensor device.

* * * * *